United States Patent [19]

Lyon

[11] Patent Number: 4,501,262
[45] Date of Patent: Feb. 26, 1985

[54] SOLAR HOT WATER SYSTEM WITHOUT HEAT EXCHANGER

[75] Inventor: Floyd A. Lyon, Brookville, N.Y.

[73] Assignee: Halm Instrument Co. Inc.

[21] Appl. No.: 139,832

[22] Filed: Apr. 14, 1980

[51] Int. Cl.³ .............................................. F24J 3/02
[52] U.S. Cl. .................................... 126/437; 126/422
[58] Field of Search ............... 126/437, 422, 420, 423, 126/400; 165/104 S

[56] References Cited

U.S. PATENT DOCUMENTS

| | | | |
|---|---|---|---|
| 2,167,576 | 7/1939 | Kiser | 126/423 |
| 2,486,833 | 11/1949 | Freund | 126/437 X |
| 4,003,365 | 1/1977 | Wiengand et al. | 126/437 |
| 4,044,754 | 8/1977 | Cronin et al. | 126/420 X |
| 4,052,000 | 10/1977 | Honikman | 126/437 X |
| 4,055,055 | 10/1977 | Horwitz | 126/400 X |
| 4,133,338 | 1/1979 | Honikman | 126/420 |
| 4,153,043 | 5/1979 | Goolsby | 126/437 |

Primary Examiner—Larry Jones
Attorney, Agent, or Firm—James P. Malone

[57] ABSTRACT

A solar collector is connected to a storage tank. A thermo-siphon heater is connected to the storage tank. A pressurized tank is connected to the upper portion of the storage tank. A vertically moveable insulated divider floats in the storage tank to separate hot and cold water in the storage tank. Means are provided to withdraw water from storage and feed it out under pressure.

2 Claims, 1 Drawing Figure

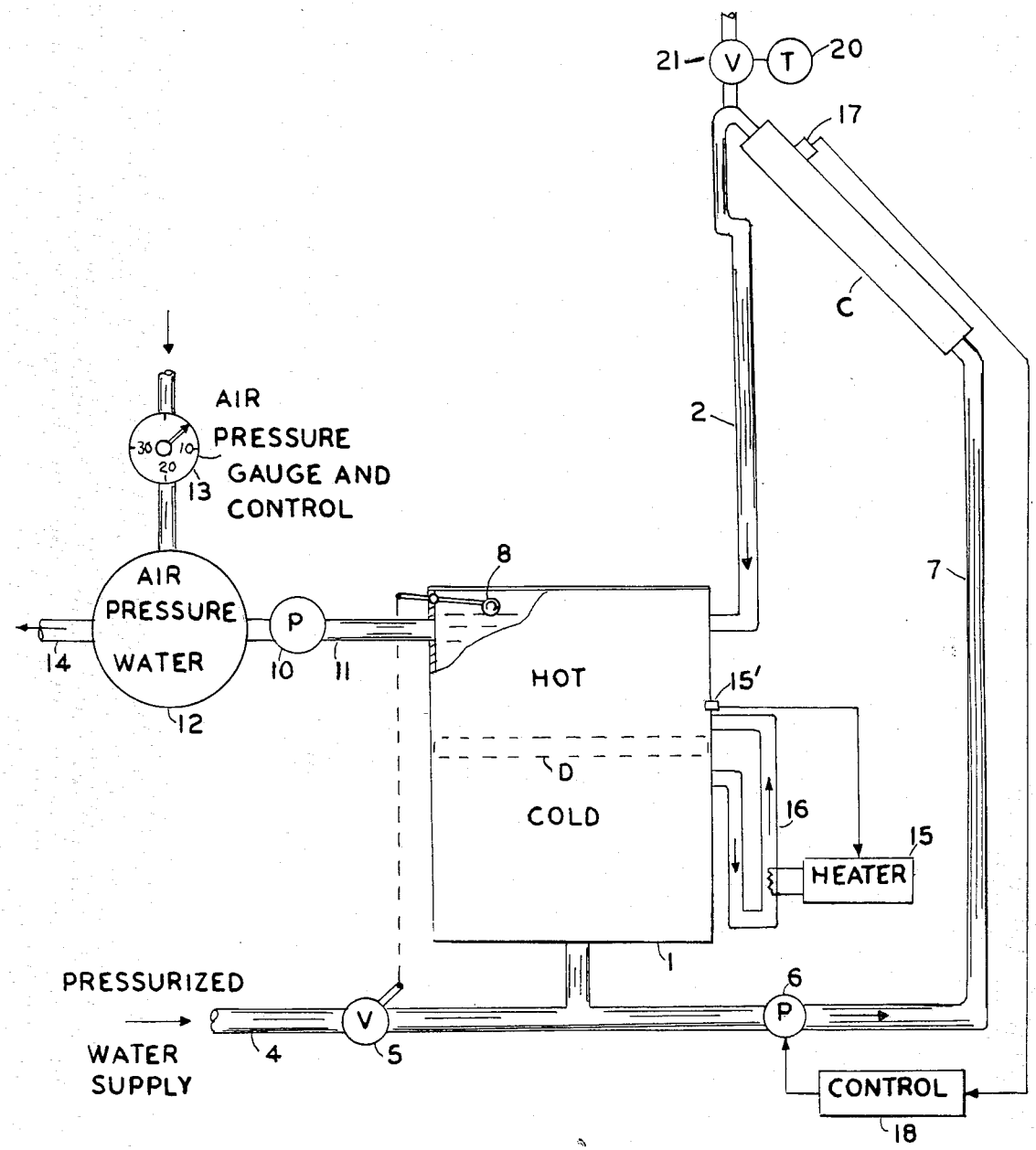

SOLAR HOT WATER SYSTEM WITHOUT HEAT EXCHANGER

TECHNICAL FIELD

This invention relates to solar hot water systems and more particularly to such systems which do not utilize a heat exchanger and which can under freezing conditions drain back into the storage tank.

BACKGROUND ART

Conventional solar hot water systems generally transfer one liquid through the solar collector and then transfer the heat from that liquid to the house hot water system through a heat exchanger. The heat exchanger is an expensive item and is also an additional possible source of failure and cuts the efficiency of the system.

The present invention provides a solar hot water heat system which eliminates the necessity for the heat exchanger. The present invention uses a non-pressurized insulated storage tank where heat water from the collector is fed to the top of the tank and the heated water from the top of the tank is pumped out to an insulated pressure tank and then to the house hot water system. The storage tank preferably has a thermo-siphon heating device connected for auxiliary heat. The storage tank also preferably has an insulated divider which is weighted to float on water of a predetermined density. The divider is formed of insulating material and tends to separate the water on the top of the tank from the cold water in the bottom of the tank. Therefore, instant hot water is available at all times.

OBJECTS OF THE INVENTION:

Accordingly, a principal object of the invention is to provide a new and improved solar hot water heating system.

Another object of the invention is to provide a new and improved hot water system which operates without a heat exchanger.

Another object of the invention is to provide a new and improved solar hot water system comprising: a storage tank, a solar collector connected to the tank, a thermo-siphon heater means is connected to the storage tank and a pressurized tank connected to the upper portion of the storage tank to provide a hot water supply and a simple means, under freezing conditions to drain the collectors back into the tank.

These and other objects of the invention will be apparent from the following specification and drawing.

Referring to the drawing, the system comprises a storage tank 1, having a solar collector C connected to supply heated water to the top of the tank by means of the pipe 2. The pressure water supply is connected to the pipe 4, and is fed via the valve 5, to the bottom of the tank 1, and water from the bottom of the tank is fed through the pump 6, to the bottom of the collector C by means of the pipe 7. The valve 5 is operated by means of a float 8 like a toilet bowl, to turn on the pressurized water from pipe 4, when the water level in the tank 1 falls below a pre-determined level.

The hot water is pumped by the pump 10 and pipe 11 from the top of the tank 1, into the pressure tank 12, when air pressure in the tank drops and is controlled by pressure switch 13.

The pressurized hot water is then fed by the pipe 14 to the house domestic hot water. The assembly of the pressure tank 12 and the pump 10 may be a relatively inexpensive item such as commonly used in pumping water from shallow wells.

The tank 1 preferably has a divider D which is formed of insulating material and it is weighted to float on water of pre-determined temperature and therefore density. Therefore, the divider D tends to separate the hot water from the top of the tank from the cold water on the bottom of the tank so that instant hot water is immediately available at all times. In the event of lack of sunlight for a prolonged period, the heater 15 is connected to the thermo-siphon 16 so that when necessary to augment the energy supply, the heat 15 may be turned on by thermostat 15' and will take water from the bottom of the tank 1 and heat it and feed it to the upper portion of the tank 1 according to the thermo-siphon principle.

A heat detector 17 is connected to turn on the pump 6 when there is sufficient temperature for heating purposes by means of the control switch 18.

In freezing weather, it is desired to drain water from the collector back into the storage tank. To accomplish this, the thermostat 20 is connected to open the venting valve 21 in the event of freezing conditions. The pump 6 is a centrifugal pump so that when it is not running, water can drain back through it.

When the hot water faucet is opened, air pressure in the tank 12 pushes hot water out of the tank 12 until pressure drops to pre-determined value. Then pump 10 is started and draws hot water out of the tank 1 until air pressure is built up again in the tank 12.

If the divider does not float freely, a pump system may be used as in U.S. patent application, Ser. No. 138,869 filed, Apr. 1, 1980 for HOT WATER SYSTEM.

It is claimed:

1. Solar hot water system comprising:
   a non-pressurized storage tank,
   a solar collector connected to the tank,
   a heater means connected to the storage tank, means to withdraw water from the upper portion of the storage tank to provide a pressurized hot water supply,
   a vertically moveable insulated divider in the storage tank to separate hot and cold water in the storage tank,
   the divider being weighted to float on water of pre-determined temperature and density.

2. Apparatus as in claim 1 having a venting valve connected to the top of the collector to facilitate draining the collector back into storage during freezing conditions.

* * * * *